(12) United States Patent
Tremblay et al.

(10) Patent No.: US 7,515,752 B2
(45) Date of Patent: Apr. 7, 2009

(54) SKETCH RECOGNITION AND ENHANCEMENT

(75) Inventors: Christopher Jason Tremblay, Cantley (CA); Pascal Bécheiraz, Gatineau (CA); Rick Charles Champagne, Ottawa (CA); Valentin Ivanov, Ottawa (CA); Daniel Jetté, Orleans (CA); Paul Legomski, Ottawa (CA); Shawn Lipstein, Seattle, WA (US); Vladimir Makarov, Kanata (CA)

(73) Assignee: Corel Corporation (CA)

( * ) Notice: Subject to any disclaimer, the term of this patent is extended or adjusted under 35 U.S.C. 154(b) by 745 days.

(21) Appl. No.: 10/929,021

(22) Filed: Aug. 27, 2004

(65) Prior Publication Data

US 2006/0045343 A1 Mar. 2, 2006

(51) Int. Cl.
*G06K 9/00* (2006.01)
(52) U.S. Cl. .................. 382/187; 382/186; 382/182
(58) Field of Classification Search ................ 382/203, 382/187
See application file for complete search history.

(56) References Cited

U.S. PATENT DOCUMENTS

| | | | | | |
|---|---|---|---|---|---|
| 4,731,857 | A | * | 3/1988 | Tappert | 382/178 |
| 5,038,382 | A | * | 8/1991 | Lipscomb | 382/189 |
| 5,454,046 | A | * | 9/1995 | Carman, II | 382/186 |
| 5,590,220 | A | * | 12/1996 | Takahashi | 382/203 |
| 5,615,283 | A | | 3/1997 | Donchin | 382/187 |
| 5,734,383 | A | | 3/1998 | Akimichi | 345/420 |
| 5,740,273 | A | * | 4/1998 | Parthasarathy et al. | 382/187 |
| 5,838,820 | A | | 11/1998 | Bergman | 382/187 |
| 5,854,855 | A | * | 12/1998 | Errico et al. | 382/187 |
| 6,587,587 | B2 | * | 7/2003 | Altman et al. | 382/181 |
| 6,597,360 | B1 | * | 7/2003 | Stamm et al. | 345/469 |
| 6,651,221 | B1 | | 11/2003 | Thompson et al. | 715/541 |
| 6,738,519 | B1 | * | 5/2004 | Nishiwaki | 382/228 |
| 7,111,248 | B2 | * | 9/2006 | Mulvey et al. | 715/812 |
| 2002/0097910 | A1 | | 7/2002 | Guha | 382/187 |
| 2002/0150297 | A1 | | 10/2002 | Gorbatov et al. | 382/202 |
| 2008/0240570 | A1 | * | 10/2008 | Shi et al. | 382/189 |

OTHER PUBLICATIONS

Pen&internet's "riteShape", Product Info, Evaluation Program, Quick Start Guide, and Online Demo, Automatic Shape Alignment, and Perfecting Common Shapes, posted on the Internet Jun. 18, 2004, and accessed Sep. 21, 2006, http://web.archive.org/web/20040619074939/www.penandinternet.com/piweb/products/riteshape/rs_prodinfo.asp.
Pen and Internet Article, "Product Info" 2004.
Pen and Internet Article, "Online Demo-Perfecting Common Shapes" 2004.
Pen and Internet Article, "Online Demo-Automatic Shape Alignment" 2004.

\* cited by examiner

*Primary Examiner*—Matthew C. Bella
*Assistant Examiner*—Sath V. Perungavoor
(74) *Attorney, Agent, or Firm*—Hayes Soloway P.C.

(57) ABSTRACT

A drawing assistance system enhances a sketch drawn by a user in an electrical document on a computer system by collecting stroke data from one or more strokes of a sketch as a user draws the sketch. The stroke data includes time-based information and features of each stroke. The strokes are handled based on the time-based information, and analysed based on the strokes handled based on the time-based information. The sketch is enhanced based on results of the analysis.

28 Claims, 7 Drawing Sheets

SKETCH RECOGNITION AND ENHANCEMENT

This invention relates to sketch recognition and enhancement, and more particularly, to a method and system for analysing a rough sketch and transforming it into a more precise, aesthetic version.

BACKGROUND OF THE INVENTION

There exist various computer software applications that allow users to create illustrations. In current illustration computer software, content is typically created using a variety of tools that the applications provide. For example, a "Rectangle" tool is used to create rectangles and a "Bezier" tool can be used to create arbitrary curves. There are typically many tools to enable the user to create illustrations. Each of these tools behave differently, which requires users to learn the functionality of multiple tools. In addition, it is often necessary to use a combination of these tools in order to create the desired result.

Learning how to use the variety of tools can be time consuming and can require training. In addition, switching between various tools to create a vector illustration is not an ideal workflow. These tools do not allow users to simply draw as if sketching on a sheet of paper. Thus, users cannot focus on the creation process, instead they have to think about which tools to use to achieve the desired result.

Existing vector illustration software applications offer very little in terms of automatic sketch enhancement. Typically these tools offer some kind of curve smoothing to help users achieve smooth curves when drawing strokes.

Other existing applications have offered additional drawing assistance to allow the user the ability to automatically create a polyline by drawing a stroke. Vertices in the polylines are created at the high-curvature points in the stroke, and line segments join the vertices to form the resulting polyline.

However, in both the previous examples, the user still needs to switch between tools to create different kinds of shapes and objects, such as rectangles and ellipses. In these examples, the application has no knowledge of the sketch, and only polylines and curves are created in this fashion. Also, each of these tools have a single purpose, that of creating curves or polylines, but not both.

There exist an illustration application that has limited ability to recognize basic shapes such as rectangles, ellipses, triangles, parallelograms, and some variations of shapes such as dashed or bold. However, these functions are relatively limiting.

Also, a system has been proposed that allows a user to sketch a rough shape and then replaces it with the most probable shape that it could recognize. This system has several flaws, including many incorrect recognitions, a relatively small number of different recognizable shapes, and it has no specified behaviour for sketches that it can not recognize.

Pen & Internet (trademark of Pen&Right) provides riteShape (trademark of Pen&Right), which is integrated into an online e-mail client called riteMail (trademark of Pen&Right). This system allows some shape recognition and enhancement of shapes, such as smoothing and alignment of circles, squares, ovals, rectangles, triangles, arrows and lines. However, this shape recognition is still limited to certain shapes and cannot enhance other shapes in a satisfactory manner.

It is therefore desirable to provide a better mechanism to recognize shapes and enhance sketches.

SUMMARY OF THE INVENTION

It is an object of the invention to provide a novel sketch recognition and enhancement system and method that obviates or mitigates at least one of the disadvantages of existing systems.

The invention collects stroke data including time-based information, and uses analysis of unknown shapes using various analysing processes which may be applied or not applied to the strokes under analysis.

In accordance with an aspect of the present invention, there is provided a method of enhancing a sketch drawn by a user in an electrical document on a computer system. The method comprises the steps of collecting stroke data from one or more strokes of a sketch as a user draws the sketch, the stroke data including time-based information and features of each stroke; handling the strokes based on the time-based information; analysing the strokes based on the strokes handled based on the time-based information; and enhancing the sketch based on results of the analysis.

In accordance with another aspect of the invention, there is provided a drawing assistance system for enhancing a sketch drawn by a user in an electrical document on a computer system. The drawing assistance system comprises a sketch recognition module having a timer, a data collection handler for collecting stroke data from one or more strokes of a sketch as a user draws the sketch, the data collection handler using the timer to include in the stroke data time-based information and features of each stroke, a stroke analyser for handling the strokes based on the time-based information, and analysing the strokes based on the strokes handled based on the time-based information; and a sketch enhancement module for enhancing the sketch based on results of the analysis.

In accordance with another aspect of the invention, there is provided a computer readable medium having computer readable code embodied therein for execution of the method of enhancing a sketch drawn by a user in an electrical document on a computer system.

In accordance with another aspect of the invention, there is provided a carrier wave embodying a signal representing computer code which when executed by a processor causes the processor to execute the method of enhancing a sketch drawn by a user in an electrical document on a computer system.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
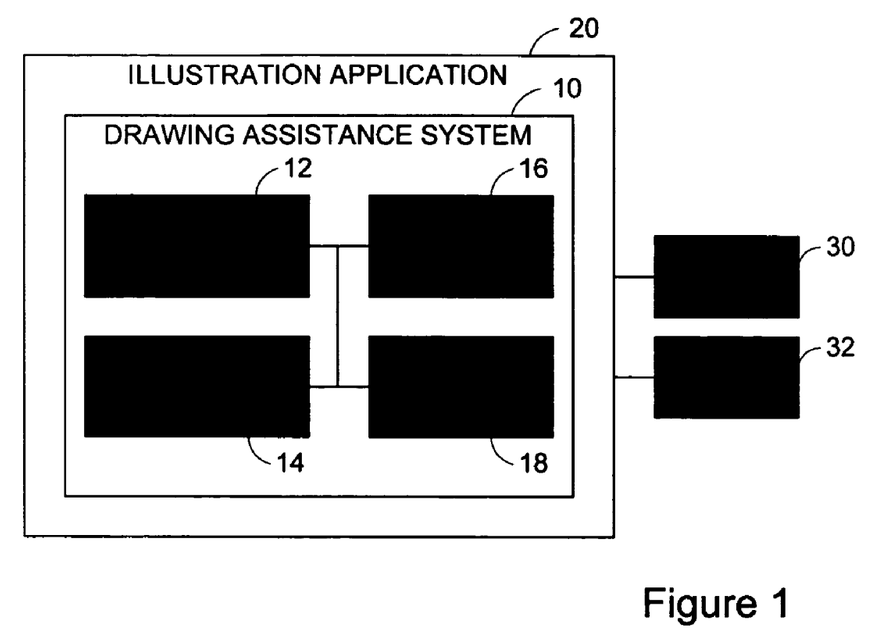
FIG. 1 is a block diagram showing a drawing assistance system in accordance with an embodiment of the invention.

Referring to FIG. 1, a drawing assistance system 10 in accordance with an embodiment of the present invention is described. The drawing assistance system 10 is suitably used for an illustration application 20, such as an application for Computer Aided Design (CAD) and 2D vector graphics.

The drawing assistance system 10 may be used as part of the illustration application 20 as shown in FIG. 1, or it may be used with a separate illustration application. The illustration application 20 runs on a computer system (not shown) that has an input device 30 and an output device 32. Using the illustration application 20, users can illustrate sketches in an electrical document through the input device 30, such as a pen-tablet or a mouse. The sketches are presented to the users through the output device 32.

The drawing assistance system 10 has a sketch recognition module 12, a sketch enhancement module 14, an assistance manager 16 and a user interface 18.

The sketch recognition module 12 collects stroke data, analyses strokes, and recognizes strokes and shapes through various processes or algorithms, such as a shape recognition process, an enhancement process and other processes as further described below. The stoke data includes data for each point sampled in the stroke as well as data for the stroke itself such as time-based information, e.g., start and end time, and computed features of each stroke. The data for each point comprises of x-y coordinates, and may also include information such as pressure, tilt, time and other data supported by the hardware. The analysis and recognition of strokes and shapes are performed based on the stroke data collected. The sketch enhancement module 14 replaces some strokes with enhanced images and adjusts the results. Thus, the drawing assistance system 10 allows users to sketch an approximation of the desired result using an input device. The drawing assistance system 10 automatically transforms the input sketch into a more precise, aesthetically pleasing drawing.

Figure 2:
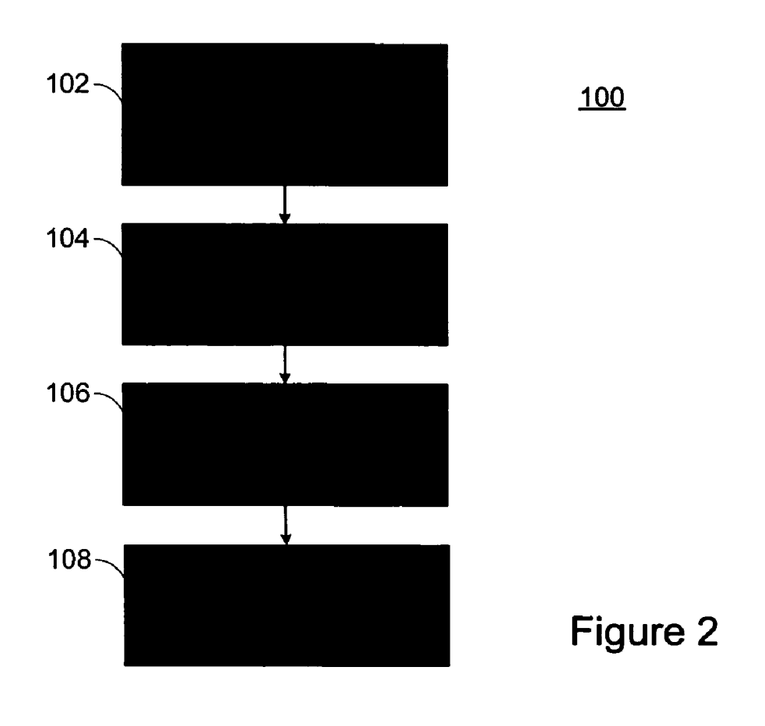
FIG. 2 is a flowchart showing an example of the operation of the drawing assistance system.

FIG. 2 illustrates a basic workflow 100 of the drawing assistance system 10. One or multiple strokes are sketched by a user, using an input device 30. The drawing assistance system 10 collects data regarding the strokes as the user sketches the strokes (102). The drawing assistance system 10 analyses the strokes (104) using the sketch recognition module 12. The drawing assistance system 10 may also analyse at this time any existing sketch information on the current document where the new strokes are intended to be placed. Based on the analysis performed in step 104, the drawing assistance system 10 replaces some or all of the strokes created by the user with more precise or aesthetic strokes or shapes (106) using the sketch enhancement module 14. In some cases, some strokes may be left intact if the drawing assistance system 10 interprets this action as the correct one. Once the strokes are replaced, the user can optionally edit and refine the various strokes and shapes using the tools provided by the drawing assistance system 10 through the user interface 18 (108).

Figure 3:
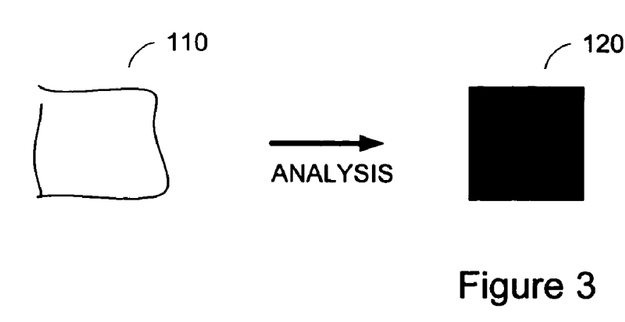
FIG. 3 is a diagram showing an example of analysis carried by the drawing assistance system.
Figure 4:
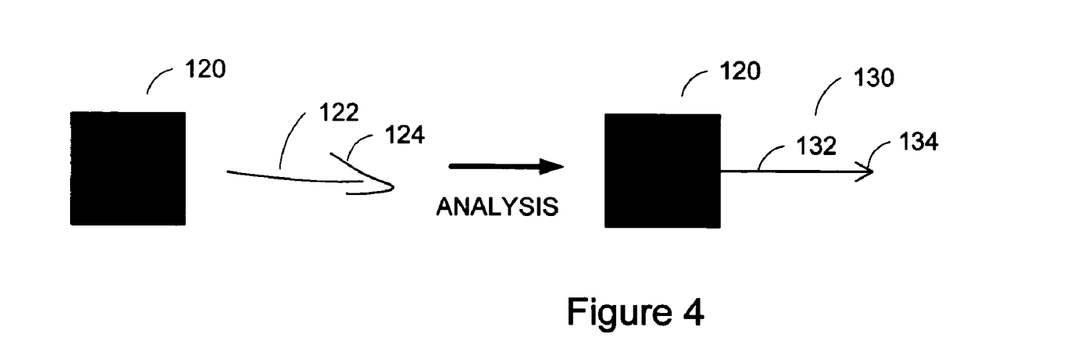
FIG. 4 is a diagram showing another example of analysis carried by the drawing assistance system.

FIGS. 3 and 4 are very simple examples to illustrate the workflow 100. The user starts with a blank electrical document, and creates on the document a single stroke resembling a square 110. The drawing assistance system 10 collects the stroke (102) and interprets the stroke 110 as a square (104). It replaces the stroke 110 with a perfect square shape 120 (106).

Then, as shown in FIG. 4, the user creates two additional strokes 122 and 124 on the side of the square 120. The drawing assistance system 10 collects the data of the strokes 122 and 124 (102). These strokes 122 and 124 are interpreted as an arrow (104). The drawing assistance system 10 replaces the strokes 122 and 124 with a perfect arrow 130 having a straight line 132 and an arrowhead 134, and connects the arrow 130 to the square 120 because of the proximity of the shapes (106).

After the examples of FIGS. 3 and 4, the drawing assistance system 10 may allow the user to edit the shapes 120, 130 (108). For example, the user may adjust the style of the arrowhead 132 as desired.

The stroke data collection and analysis of strokes are further described in detail, referring to FIGS. 5-8.

Figure 5:
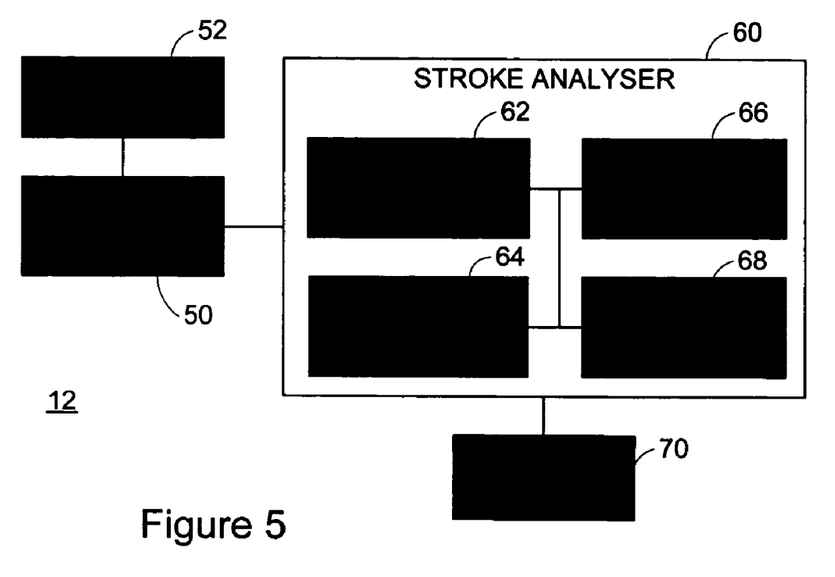
FIG. 5 is a block diagram showing a sketch recognition module of the drawing assistance system.

FIG. 5 shows details of the sketch recognition module 12. The sketch recognition module 12 has a data collection handler 50, a timer 52 and a stroke analyser 60. The stroke analyser 60 has a a stroke grouping handler 62, a stroke comparator 64, a segmentation handler 66 and a stroke interpreter 68. The sketch recognition module 12 also uses a data store 70 for storing information of known shapes. The data store 70 may be part of the sketch recognition module 12 or may be part of the other system.

The data collection handler 50 handles collection of stroke data. It uses the timer 52 to start and end the stroke data collection process and trigger the recognition process. The timer 52 has a timeout period. When the timeout period expires, the recognition process is triggered. Every time a stroke is started before the timer 52 expires, the timer is reset allowing more time before the recognition process is triggered. When the timer 52 expires without a new stroke being created, the collected strokes are given to the stroke analyser 60 and the next analysing process is triggered. The timer is also used to collect time-based information of each stroke, such as the time period spent for each stroke and each interval between strokes.

Figure 6:
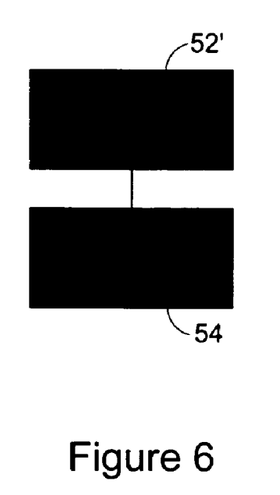
FIG. 6 is a block diagram showing another embodiment of a timer.

The timer 52 may be a preset timer, a dynamic timer or a timer having both preset and dynamic functions. A preset timer has a preset timeout period, which is set by the drawing assistance system 10 or by the user through the assistance manager 16 and the user interface 18. The dynamic timer is set and reset based on the user's interactions as described below. As shown in FIG. 6, the dynamic timer 52' may have a user interaction detector 54 to detect user's interactions.

The timer 52, 52' may be set to allow the data collection handler 50 to collect stroke data representing a stroke or a set of strokes before expiration.

The stroke analyser 60 analyses the collected stroke data using the stroke grouping handler 62, the stroke comparator 64, the segmentation handler 66 and stroke interpreter 68. The stroke grouping handler 62 determines if one or more strokes should be considered as a group. The stroke comparator 64 compares strokes or groups of strokes with known shapes using the data stored in the data store 70. Thus, the stroke analyser 60 can perform shape recognition of known shapes, such as a circle, a rectangle and so on. Any unknown strokes are handled by the segmentation handler 66 which segments the strokes into lines and curves. The stroke interpreter 68 analyses these lines and curves and enhances them. In this way, the stroke analyser 60 can also handle enhancement of shapes or sketches unknown to the system.

The stroke analyser 60 groups shapes using the stroke grouping handler 62. The stroke grouping handler 62 uses the time information stored about the strokes in order to determine how to group the strokes, as further described below.

Then the stroke analyser 60 tries to identify known shapes from the strokes and groups of strokes using the stroke comparator 64. The stroke comparator 64 computes and analyses the stroke features and compares the results with the data store 70 to identify known shapes. Using fuzzy logic, the stroke comparator 64 gives a confidence of recognition. For example, it could determine that a stroke, or group of strokes matches data for a circle at 78%, data for an ellipse at 43% and 0% for the other shapes. To evaluate the confidence of recognition, the stroke comparator will compare features for the strokes with expected values stored in fuzzy tables. Each feature is given a matching value ranging from 0 to 100%. The overall confidence is determined by taking the minimum match of all the features used by the known shape being matched against. The stroke or group of strokes is thus compared to all the known shapes from the data store 70 and the best match, if any, is kept.

Each stroke, or group of strokes that have been marked as recognized is removed from the list of the strokes and the results are kept for later usage. The stored results include information about shape type, orientation, position in document, shape attributes (bold, dashed, filled etc.), recognition confidence etc.

Then this process is repeated until there are no more successful recognitions. In the process, the stroke grouping handler 62 may subdivide groups that fail to be recognized, as well as try to recognize strokes individually. It may also try to combine recognized shapes that had low recognition confidence with other unknown strokes to see if a recognition match with higher confidence can be found. In this way, the stroke grouping handler 62 and the stroke comparator 64 can recognize known shapes in various grouping combinations and select the result having the highest recognition confidence.

Once all the known shapes have been identified from the individual strokes or groups of strokes, the strokes that remain unknown, if any, are given to the segmentation handler 66.

The segmentation handler 66 segments the strokes at high curvature points. Then it analyses each segment to mark them as curves or linear segments.

The stroke interpreter 68 then analyses the segments (lines and curves) of the unknown strokes to create the enhanced result. To achieve this, it may align line segments and vertices to an adaptive Cartesian grid formed by the high curvature points, as determined by the stroke segmentation handler 66. In addition, it may smooth curves and apply a transformation to them in order to connect the curves to the line segments. It may also look for symmetry in the sketch and transform the lines and curves segments so that they follow this symmetry.

The stroke interpreter 68 determines which enhancement processes should be applied to which strokes or group of strokes. The selection of the enhancement processes is carried out automatically based on the features of the strokes or group of strokes as further described below. To determine which enhancements should be carried out, the stroke interpreter 68 has several analysis procedures. It may look at the number of intersections inside the stroke collection. Combining this information with the number of linear segments compared to the number of curve segments gives an indication of the context of the sketch. The stroke interpreter 68 may also try to recognize text out of the strokes using a separate text recognition module, that is optionally interfaced by the system 10. The stroke interpreter 68 may also automatically apply symmetry if there is symmetry detected. In this way, the stroke interpreter 68 can determine which enhancements algorithms to apply, if any. The stroke interpreter 68 may determine to leave original strokes as they are when it determines that the strokes are undesirable to enhance. Examples of sketches for which it may be undesirable to enhance include hand-written text, shading of objects, curly hair. In the case of curly hair, the system 10 may elect to perform curve smoothing only.

Thus, the stroke analyser 60 can handle curves and line segments individually in a single object (e.g., a sketch of a puzzle piece). It can recognize multiple shapes in a single sketch. It can also handle shape properties (e.g., bold, dash and fill attributes)

Figure 7:
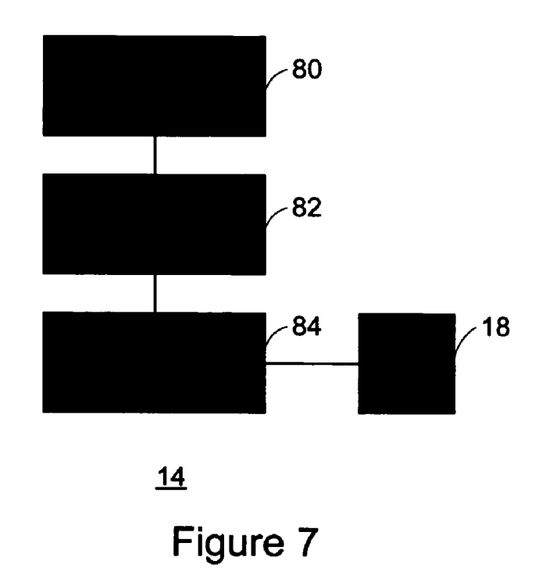
FIG. 7 is a block diagram showing a sketch enhancement module of the drawing assistance system.

FIG. 7 shows details of the sketch enhancement module 14. The sketch enhancement module 14 has a content analyser 80, sketch replacement handler 82 and sketch adjustment handler 84.

The content analyser 80 analyses the relation between the new sketch under enhancement and existing content in the electrical document. For example, it analyses if the new sketch content should be snapped to existing content on the document (shape-to-shape snapping), and/or if the new sketch content should be snapped to an adaptive Cartesian grid formed by existing content on the document.

A drawing assistance system 10 may have all or selected some of these modules and functions from the sketch enhancement module 14 that are described above. Some of the modules or features may be disabled, either programmatically, or by the user through an adequate system interface 18 and the assistance manager 16.

Figure 8:
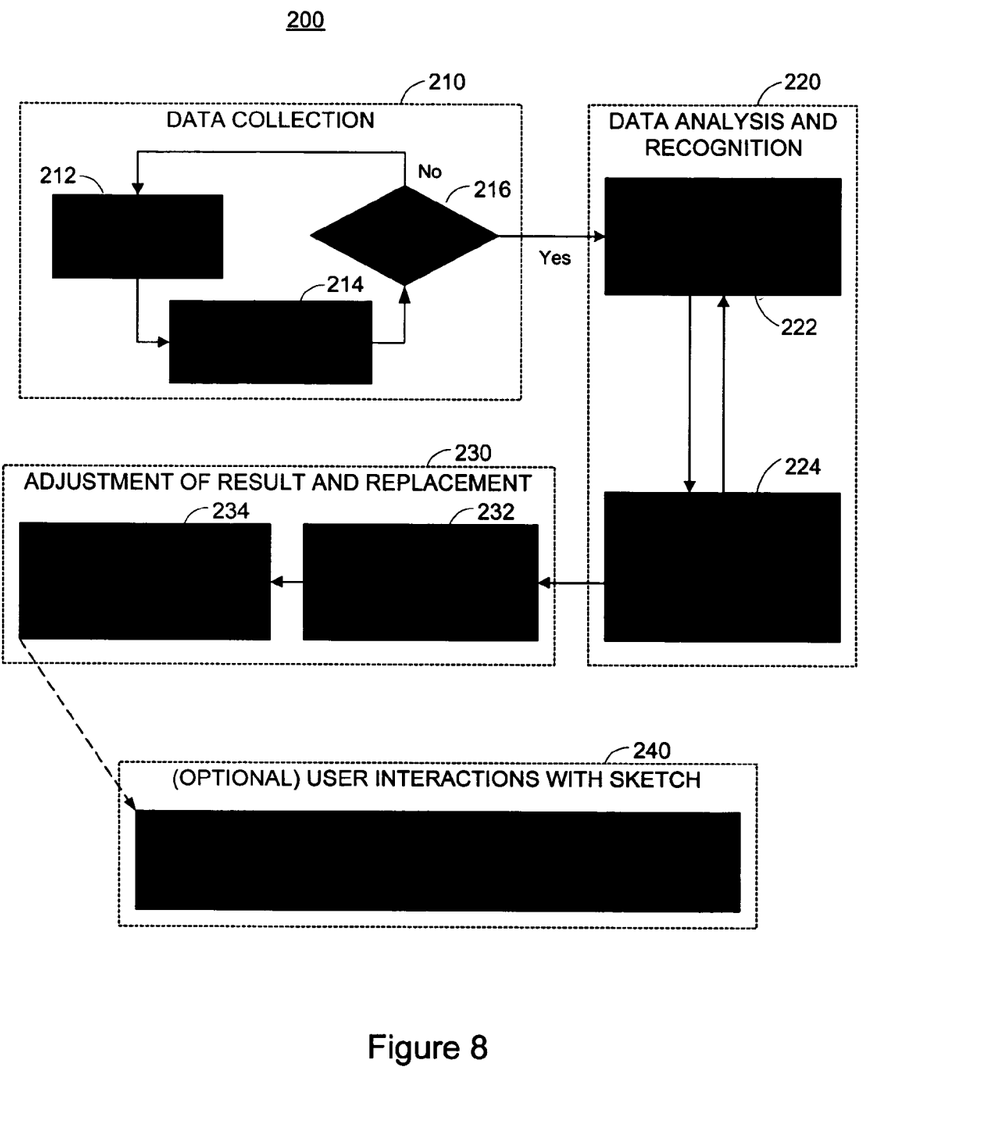
FIG. 8 is a flowchart showing another example of the operation of the drawing assistance system.

FIG. 8 illustrates the stroke recognition and enhancement process 200. The process 200 comprises a data collection step 210, a data analysis and recognition step 220, an adjustment of result and replacement step 230, and an optional step 240 of user interactions with sketch.

In the data collection step 210, the drawing assistance system 10 collects and stores strokes (214), using the data collection handler 50, as the strokes are entered by the user (212). These strokes can be entered via a pen, a mouse or any other form of input device 30. Along with the data collection, the drawing assistance system 10 manages the timer 52 or 52' which handles the start of the analysis and recognition step 220. Whenever the timer 52 or 52' expires (216), the drawing assistance system 10 starts the analysis process 220 on the strokes which were collected. Once the strokes are analysed (220) and replaced (230) in the document, a new set of strokes are collected (210) for analysis. It is therefore important that the analysis process 220 and replacement 230 be carried out in real-time to avoid disruption of the sketching workflow.

Every time the user starts a new stroke, the system 10 detects the start of the new stroke, and resets the timer 52 or 52', thus allocating more time to the user for creating additional sketch content before the timer 52 or 52' expires. When the full timeout period expires, without the user creating a stroke, the process moves to perform the data analysis and recognition step 220 on the collected strokes. This allows users to continue sketching as they wish, and only when they pause longer than the timeout is the analysis of strokes performed.

In a different embodiment where a pen-based interface is used, the drawing assistance system 10 may provide a more advanced dynamic timer 52', as shown in FIG. 6. The dynamic timer 52' is modified dynamically based on the user interactions with the tablet or the screen. In this embodiment, the timer 52' uses a user interaction detector 54. When the user interaction detector 54 detects certain user interactions, the data collection handler 50 adjusts the dynamic timer's 52' timeout period. This dynamic property of the timer 52' in the pen-based system allows for better user interactions with the drawing assistance system 10. For example, if the user moves the pen out of proximity of the screen or tablet, the drawing assistance system 10 interprets this action as an interruption in the sketching workflow. Therefore, the drawing assistance system 10 adjusts the timeout to be shorter, in order for the analysis and recognition step 220 to be performed more rapidly. However, if the user pauses while sketching and remains in proximity of the input device, the timeout will remain static if the stylus is relatively still and will even be lengthened if the user moves the stylus across the input device (while remaining in proximity). The timer 52' is adjusted in this way, for various interaction scenarios, in order to increase or decrease the timeout, which is initially set to a user-specified value or a system default value. The timeout period of the timer 52' may be adjusted based on the average velocity of the user's sketching. The timer 52' may also consider the currently collected strokes information, such as the number of strokes, the average length of the strokes, etc.

Once the timer 52 or 52' expires and the data collection step 210 ends, the process 200 moves to the data analysis and recognition step 220. In this step 220, time-based grouping of data 222 is performed using the stroke grouping handler 62. The drawing assistance system 10 has, at this point, a collection of strokes created by the user, which are to be analysed. The goal of the stroke grouping step 222 is to perform a high-level grouping of the strokes before performing any form of recognition.

The collection of strokes may contain zero, one, two or several shapes, objects and sketch elements. The stroke grouping handler 62 looks at the time elapsed in between each stroke to determine how to group the strokes. For example, if there is a statistically larger amount of time in between two strokes, this is a possible indication that a new shape or object was started. The result may be a single or multiple groups of strokes, depending on the strokes created by the user.

The stroke grouping step 222 and recognition of known shapes by the stroke comparator 64 (part of step 224) work in an iterative manner in order to recognize all the known shapes from the collection of strokes. After an initial stroke grouping in step 222, the stroke comparator 64 identifies known shapes from the groups. The recognition results are then used by the stroke grouping handler 62 in step 222, in addition to time information, in order to improve the group candidates. Any known shapes are removed from the collection of strokes, and the remaining unknown strokes are re-analysed for grouping or may be combined with strokes or groups of strokes that resulted in low recognition confidence. The process is repeated until there are no more strokes, or the remaining strokes can not be recognized as known shapes. The final grouping and recognition results are determined by the highest recognition confidence, giving precedence to recognized groups over individual strokes. Giving precedence to recognized groups over recognized strokes is important in order to be able to identify, for example, a dashed line over a series of small lines.

Figure 9:
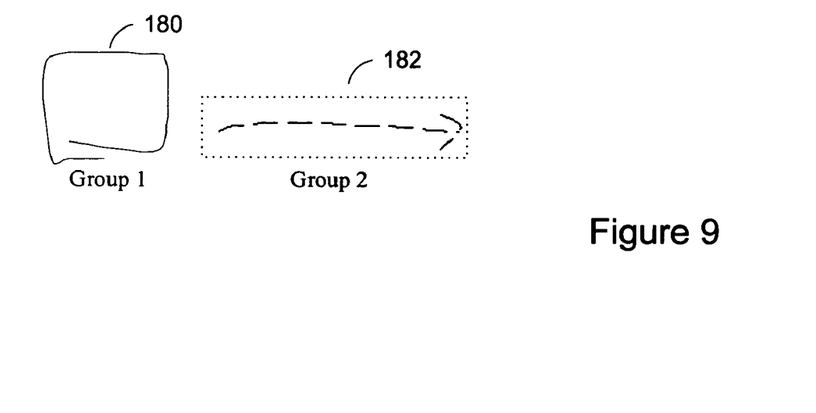
FIG. 9 is a diagram showing an example of grouping of strokes.

For example, as shown in FIG. 9, if the user creates a single stroke in a shape of a square, and then, pausing slightly in between the 2 shapes, creates a dashed arrow with ten consecutive strokes, in this case the stroke grouping handler 64 creates two groups. The first group 180 contains the single stroke which is the solid square, and the second group 182 is the collection of strokes which represent the dashed arrow. The small delay that was introduced in between the sketching of these two shapes was used to determine the groups. Analysing time information will usually reveal small delays in between shapes when users are creating content. These delays may be attributed to the user moving the stylus to create the new shape, or simply a small pause or hesitation for thinking before creating a new shape. The system 10 may also review the group candidates by looking at recognition results combined with time information.

Using time information and recognition confidence results, but not spatial proximity of shapes, allows users to create shapes that overlap and still be correctly grouped and recognized. Using the same approach, the stroke grouping handler 62 can handle more complex scenarios as well, such as multiple shapes created with multiple strokes. As well, it handles grouping for arbitrary shapes, such as a sketch of a house and car. The grouping handler 62, having removed any known shapes from the collection of strokes, can look at time information to group unknown strokes before passing the strokes to the segmentation handler 66 and interpreter 68.

Working iteratively with the stroke grouping handler 62 (222), the analysis and recognition step 224 performs the analysis and recognition of known shapes by the stroke analyser 60 using the stroke comparator 64 and data store 70. The stroke analyser 60 analyses strokes and groups of strokes as determined by the stroke grouping handler 62. The stroke analyser 60 tries to identify any of the known shapes from the strokes using the stroke comparator 64 based on the information of known shapes stored in the data store 70, before analysing unknown shapes.

In order for the stroke comparator 64 to be able to recognize shapes, it computes a series of features from the points comprising the stroke or group of strokes to be analysed, which will be used to determine the exact shape, if any. Features that are used by the stroke comparator 64 may include but are not limited to: the smallest orientated enclosing rectangle, the bounding rectangle, the convex hull, the largest inscribed triangle inside the convex hull, the largest inscribed quadrilateral inside the convex hull, the best fitted ellipse etc. These geometrical features are then analysed in terms of width, length, area, perimeter and other morphological properties. In addition, the system 10 may compute the number and position of corners, the distance between sampled points in the stroke, the number of points inside and outside the convex hull etc. In this way the system 10 builds a list of features which will be compared with the expected results in the data store 70. For each known shape, the data store 70 has a series of specific features that can uniquely identify the shape. Each shape uses only a selection of the features and each shape's features have an expected range of values. For example, a line will have a very thin oriented enclosing rectangle. The expected ratio of the width of the enclosing rectangle over its length will be a very small value. Each shape is evaluated using fuzzy logic by the stroke comparator 64 to determine if they match the expected values for their specific features. In some cases there can be more than one positive match. In this scenario the stroke comparator 64 selects the shape resulting in the highest confidence. In addition, some shapes have several variants, for example the triangle family of shapes. If the stroke comparator 64 identifies a stroke or group of stroke as being part of a particular shape family, the stroke comparator 64 uses other features which are specific to each variant in the family, to determine which specific shape is the correct one.

Then, for strokes or groups which do not match this criteria, the stroke analyser 60 performs a generic sketch enhancing process using the stroke interpreter 68.

The generic sketch enhancing process handles the reality that any given system can not possibly know about all the possible shapes and objects that a user may want to create. It can know about basic primitives, such as geometrical shapes and common shapes such as arrows and others. Given that the number of sketch possibilities are infinite, the drawing assistance system 10 provides a more generic way to enhance sketches. The stroke interpreter 68 provides multiple enhancing processes or algorithms that can be selectively applied to various types of strokes or groups of strokes.

Figure 15:
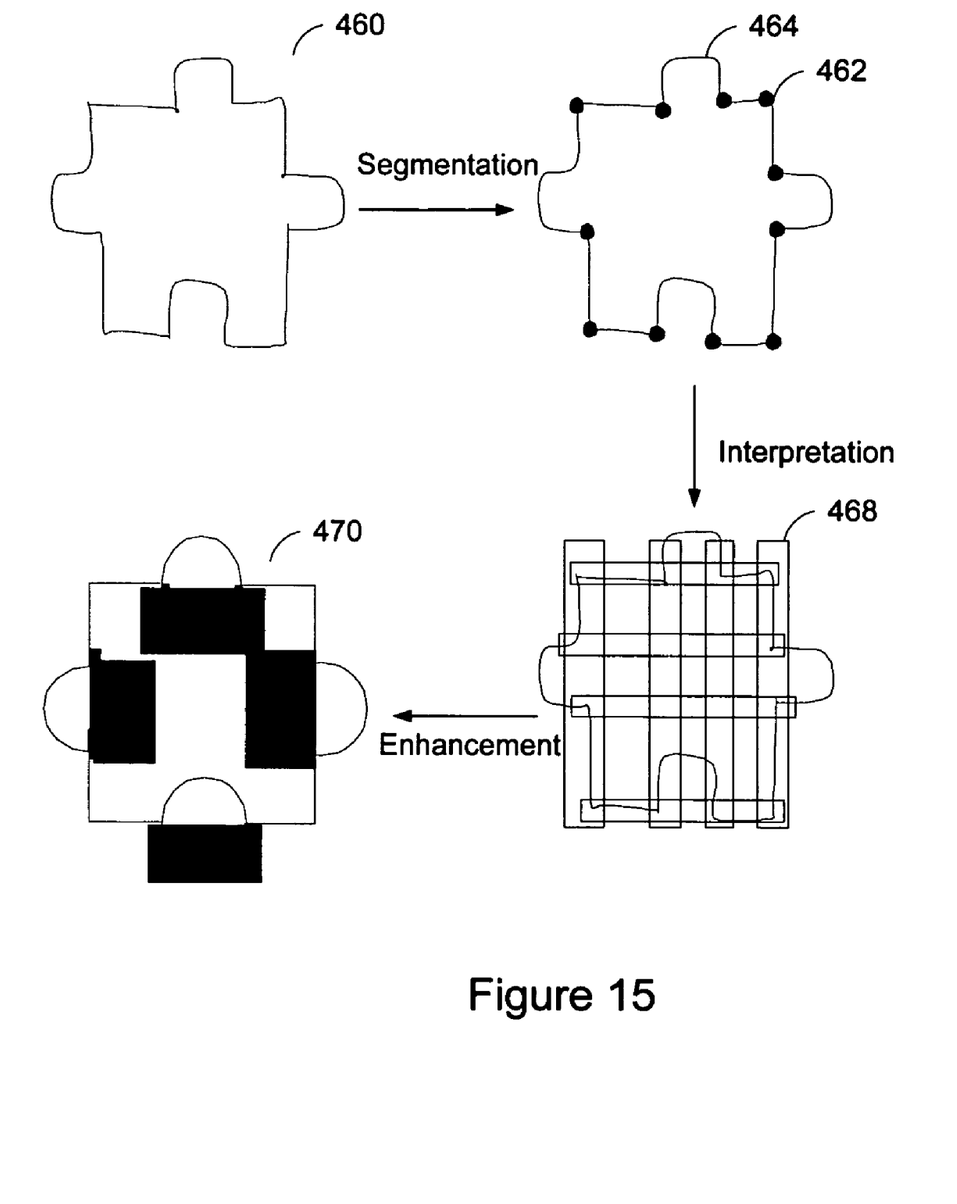
FIG. 15 is a diagram showing another example of analysis carried by the drawing assistance system.

The generic sketch enhancing process is further described referring to FIG. 15. In FIG. 15, the user starts by creating a single stroke 460 in the shape of a puzzle piece. Since this stroke 460 is not recognized as a known shape, the system 10 uses the segmentation handler 66 to find the high curvature points 462 and analyse the resulting segments 464 to determine if they are curves or linear segments. Then the stroke interpreter 68 analyses the corners and creates an adaptive Cartesian grid. Each corner is then associated to a vertical and horizontal group 468 in the grid. The system 10 also analyses the grid to determine if there is any symmetry in the positions of the vertical and horizontal groups 468. To create the enhanced result 470, the stroke interpreter 68 aligns the corners to the grid, making the line segments perfectly linear and smoothing the curves. If the curves fit an ellipse, they are fitted, otherwise Bezier smoothing or any other type of generic curve smoothing is applied to them. The corners of the curves are also aligned to the grid. The result 470 is a perfectly aligned, symmetrical puzzle piece.

Figure 10:
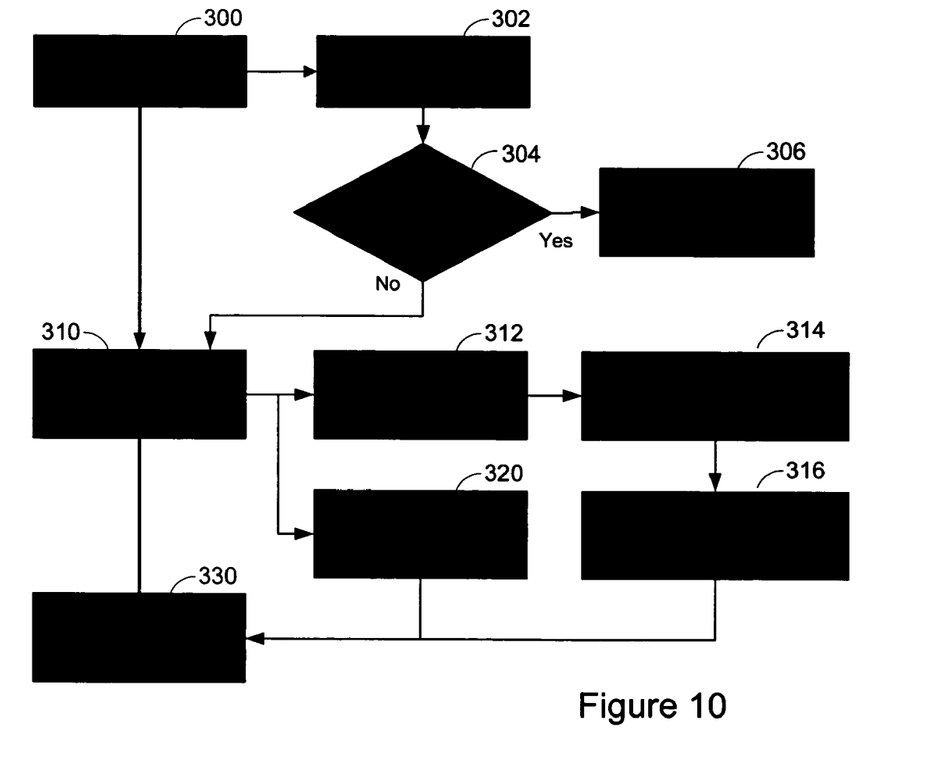
FIG. 10 is a flowchart showing an example of data analysis and recognition process.

The analysis and recognition step 224 is further described referring to FIG. 10. The stroke analyser 60 attempts to identify known shapes (300). Next, it analyses unknown strokes (310), and then enhance the sketch (330) based on the analysis (300) and (310).

Identification of known shapes (300) may be performed as follows. The drawing assistance system 10 is aware of a certain number of shapes and can look specifically for these shapes. It tries to identify a shape family (302), such as the triangle family of shapes.

To match a stroke or a group of strokes to a shape family (302), the stroke analyser 60 evaluates how the strokes match certain features of the family. The features to be considered may include the number of high-curvature points, lengths of segments between the high-curvature points, angles between segments, and/or curvature of each segment. For example, the enclosing rectangle of a stroke representing a line should be long and thin, and the enclosing rectangle of a circular stroke should have similar length and width. Each shape family has a list of features which are capable of uniquely identifying the family.

If a stroke or a group of strokes matches a shape family (304), the stroke comparator 64 then matches a specific type of shape in the identified shape family (306). For example, in the case of the triangle family, a specific shape may be identified as a perfect equilateral triangle.

Examples of known shapes that the drawing assistance system 10 handles may include lines, circles, ellipses, squares, rectangles, diamonds, parallelograms, equilateral triangles, acute isocele triangles, obtuse isocele triangles, right-angle isocele triangles, scalene triangles, right-angle scalene triangles, isocele trapezoids, right-angle trapezoids, scalene trapezoids and/or arrows. In addition, the drawing assistance system 10 may be configured to recognize for each of these shapes, specific attributes such as: normal or bold, solid or dashed, hollow or filled.

In the odd cases where strokes can be matched to more than one shape or shape family, for instance an elongated circle which may be an ellipse, the stroke analyser 60 picks the most probable shape using fuzzy logic. Fuzzy logic is also used to determine the probabilities when matching shapes to a family or to a specific type in the family. The fuzzy logic allows users to set various levels of recognition. For example, a user may want shape recognition to be performed only if the stroke analyser 60 is very certain that it is correct. In this case the stroke analyser 60 may use a threshold of 90%. Each shape can have different thresholds that are matched to the recognition levels.

Additional shape properties are evaluated in the same manner. For example, a dashed rectangle will have approximately the same morphological features as a solid one, yet it will consists of several strokes for each of the edges. A filled shape will also have the same morphological features, yet it will have many stroke points inside of the shape itself when compared to an empty shape.

Once the known shapes have been identified (300), or ruled out, the stroke analyser 60 analyses the unknown strokes which do not match any known shapes (310). In this way, the stroke analyser 60 can still enhance objects which are unknown to the drawing assistance system 10. To this end, the stroke analyser 60 identifies high-curvature points in the unknown strokes, which are called "corners" (312). The stroke analyser 60 then analyses the strokes in between these corners to determine if the segments are linear or if they are curved (314). The stroke analyser 60 recognizes those segments as lines or curves (316). Once the stroke analyser 60 recognizes the lines and curves in each stroke, the sketch enhancement module 14 then enhances the segments as perfect lines or curves (330). Linear segments are made perfectly straight, oriented to a Cartesian coordinate system if within a certain angle, and they are aligned to one another if within a certain distance. The stroke analyser 60 uses the thresholds that are dynamically computed based on the context and the length of the strokes themselves. For example, a shape with very long line segments will have much larger aligning thresholds than a shape with short line segments. This is to allow enhancing of the sketches drawn at various scales. To align the linear segments, the stroke analyser 60 may create an adaptive grid based on the similarity of the position of each corner in the stroke or group of strokes. Curved segments are smoothed, or fitted to an ellipse equation. If the curves fit an ellipse within a certain threshold, this is the preferred option. In the case where the curve is not in the shape of an ellipse, then any form of curve smoothing, such as Bezier smoothing, can be applied to the curve. The end-points of the curves are also aligned to the grid, which requires a curve to be elongated or shortened depending on the scenario. The end of the curve will be elongated if needs to be stretched in order to connect it to the closest segment. However, it will be shortened or compressed if the curve is too long and is overlapping the segment that it wants to connect to.

Another component of the analysis and recognition step 224 is symmetry analysis (320). Using the same adaptive grid system, the stroke analyser 60 detects vertical and horizontal symmetry axes, and properly aligns corners to create the symmetrical shapes.

Figure 11:
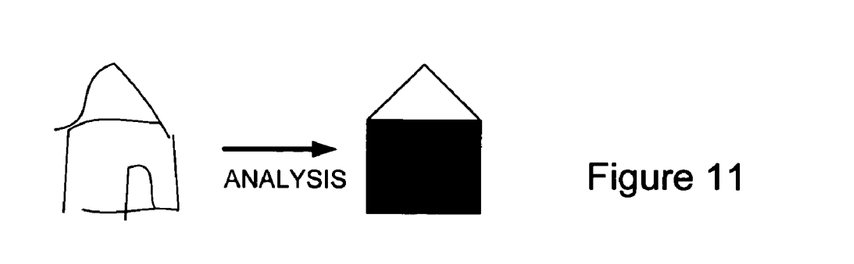
FIG. 11 is a diagram showing another example of analysis carried by the drawing assistance system.

Using the above described process, generic shapes, such as houses (FIG. 11) and cars, can be automatically enhanced by the drawing assistance system 10, without having knowledge of the nature of the shape.

If the above described generic enhancing process handles any scenarios, in some cases the enhancement process may lead to undesirable behaviour. Thus, it is preferable that the stroke interpreter 68 also provides the ability for the stroke analyser 60 to automatically select which, if any, of the enhancement processes or algorithms to apply. Depending on the scenario, the stroke interpreter 68 applies all, some or none of the enhancing processes or algorithms to the strokes.

Figure 12:
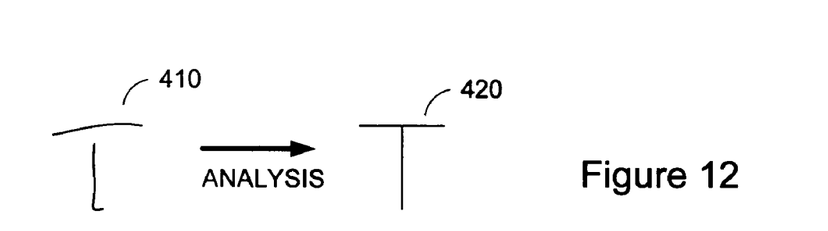
FIG. 12 is a diagram showing another example of analysis carried by the drawing assistance system.
Figure 13:
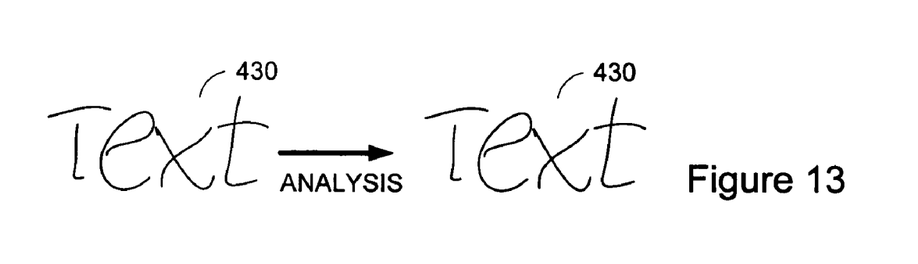
FIG. 13 is a diagram showing another example of analysis carried by the drawing assistance system.

For example, a curly stroke may have only curve smoothing applied to it. As shown in FIG. 12, the stroke interpreter 68 recognise a shape 410 that looks like the letter "T" as a shape to be enhanced if it is the only element sketched, and it aligns the lines and connects them to provide enhanced "T" 420. By contrast, as shown in FIG. 13, if the same "T" is drawn along with the letters "ext", the stroke interpreter 68 recognizes the content 430 as text, and does not enhance it 430. Leaving text intact serves two purposes: first it serves to avoid any enhancing that would remove the natural look of the handwriting. Secondly, it serves to avoid any shape enhancing from affecting the success rate of any text recognition process if the content is to be used in such a process.

By selectively applying the various shape enhancing processes or algorithms, the drawing assistance system 10 can handle various scenarios automatically, without requiring the user to turn off certain features. The drawing assistance system 10 may have all features enabled by the user selection, but it may not use any of the features to certain strokes when it determines that none should be applied to them.

The next process is the adjustment of result and replacement step 230 by the sketch enhancement module 14. Once shapes and strokes are analysed and recognized (220), the sketch enhancement module 14 then proceeds to analyse how the result will fit into the current document (232) using the content analyser 80.

In the case of an empty document, this is simple. In this scenario, the rough sketch is simply replaced (234) by the result achieved through the analysis from the data analysis and recognition step 220. However, in the case where there is already content on the document, the drawing assistance system 10 tries to adjust the result to better fit the existing content (232).

Figure 14:
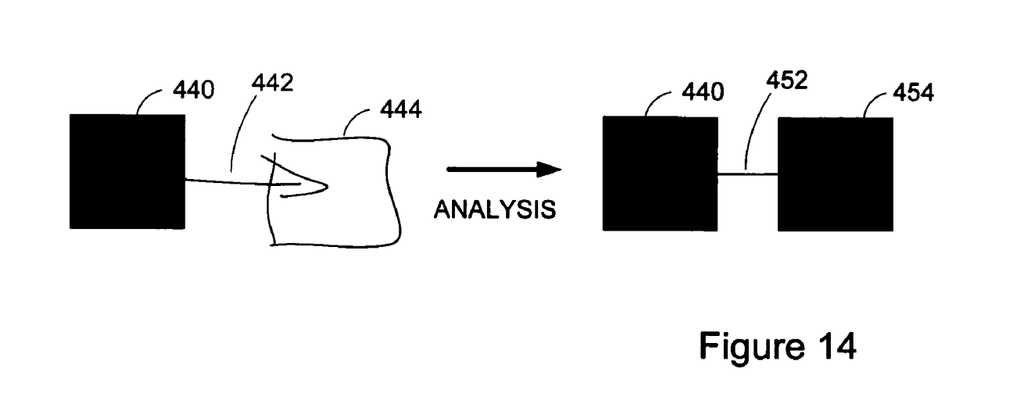
FIG. 14 is a diagram showing another example of analysis carried by the drawing assistance system.

In the case where there is already content on the document, the context analyser 80 looks at different parameters, such as proximity to the existing content and/or the shape type of the new and existing shapes in order to better understand the context. Once the context is analysed (232), the sketch replacement handler 82 adjust the sketch through various transformations, selecting the transformations which will achieve the best aesthetic result, with the least amount of deformation. Examples of transformations include translation, rotation and skewing. The transformations are selected on the basis that the minimum amount of change which will achieve an aligned result, is the preferred choice. In order to align the new content to the existing content, the system 10 looks at certain features such as corners of shapes, centres of shapes etc. Other shape specific properties may also be considered such as circle radius, shape orientation etc. The transformations are applied to the new content, but are not applied to the existing content. Another adjustment may be to simply lengthen or shorten certain line segments in order to align the corners, or connect segments together To achieve this, the system 10 moves the corners of line segments (in the case of unknown shapes). These adjustments are used to align and connect shapes, to make them have a similar size through scaling and so on. Take for example a square 440 on a document as shown in FIG. 14. If the user creates an arrow 442 and another square 444 at a certain location, the drawing assistance system 10 replaces the square 444 with a perfect square 454, and enhances the arrow 452 to connect to the two squares 440, 454 in their respective centres. In addition, the square 454 may be aligned and made similar in size to the existing square 440. Thus, the resultant square 454 and arrow 452 are adjusted to match current document content.

To connect objects together, each object maintains a list of "hotspots" which are possible connection points. The system 10 may determine "hotspots" to be at corners, in the middle of shape edges, in the centre of the shapes etc. For unknown shapes, "hotspots" may be determined to be on the corners, end of curves, in the centre of line segments or other positions deemed good candidates.

In addition, an adaptive Cartesian grid of the "hotspots" from the objects in the document can be created and updated from the various objects as they are added. This allows shapes to be aligned and positioned to the grid accordingly. Once the final position and size of the new content is determined, the original strokes are replaced with the result.

The drawing assistance system 10 may allow user interactions with the sketch (240). After the recognition and enhancement step (230), or at any other point in time during the stroke analysis and enhancement process (200), a user may interact with the sketches that are created in the document. A user may undo a recognition of a shape for example, to revert back to the rough version. The user can also edit the various objects using transformations such as rotation, translation, skewing etc. Other editing can also be provided, for instance Bezier control point editing for curves, colour and fill properties for shapes and so on. In the cases where the system 10 really identified shapes from the known primitives, the system 10 may provide shape specific editing. For example, an arrow may have specific styling for the arrowhead, or the angle of the opening of the arrowhead may be increased or decreased. Each of the known shapes can have specific attributes which can be controlled by the user. This is not possible for the parts of a sketch which are not recognized but simply enhanced. In this scenario, the curves and polylines can still be modified, the system 10 just provides more generic editing for these objects.

The drawing assistance system 10 serves the purpose of simplifying the illustration workflow. A single tool can be used to create the shapes, objects and other elements that form the sketch. In addition, the invention allows the user to focus primarily on the content, instead of requiring the user to think about both the content and the various tools that are needed to create the desired illustration. Indeed, with the invention, the user simply sketches as if drawing on a sheet of paper. This is a very natural way for creating illustrations, which makes the system easier to learn.

The drawing assistance system of the present invention may be implemented by any hardware, software or a combination of hardware and software having the above described functions. The software code, either in its entirety or a part thereof, may be stored in a computer readable medium. Further, a computer data signal representing the software code which may be embedded in a carrier wave may be transmitted via a communication network. Such a computer readable medium and, a computer data signal and carrier wave are also within the scope of the present invention, as well as the hardware, software and the combination thereof.

While particular embodiments of the present invention have been shown and described, changes and modifications may be made to such embodiments without departing from the true scope of the invention. For example, the elements of the drawing assistance system are described separatory, however, two or more elements may be provided as a single element, or one or more elements may be shared with other component in the computer system.

What is claimed is:

1. A computer implementing a method of enhancing a sketch drawn by a user in an electrical document on a computer system, the method comprising the steps of:
   collecting stroke data from one or more strokes of a sketch as a user draws the sketch, the sketch including one or more non-linguistic-character shapes, the stroke data including time-based information and features of each stroke;
   handling the strokes based on the time-based information;
   analysing the strokes based on the strokes handled based on the time-based information, wherein the analysing step comprises the steps of:
      comparing the features of one or more strokes with data of known shapes stored in a data store and identifying any known shapes; and
      analysing any unknown strokes that are not identified as a known shape by determining any high-curvature point on each unknown stroke, segmenting the unknown stroke at the high-curvature point; and determining if each segment of the unknown stroke is linear or curved; and
   enhancing the sketch based on results of the analysis, wherein the enhancing step comprising the steps of:
      replacing the identified known shapes in place of relevant strokes;
         enhancing each segment of the unknown stroke as a line when it is determined linear; and
      enhancing each segment of the unknown stroke as a curve when it is determined curved.

2. The method as claimed in claim 1, wherein the collecting step comprises the step of collecting the time-based information using a preset timer.

3. The method as claimed in claim 1, wherein the collecting step comprises the step of collecting the time-based information using a dynamic timer which is set and reset based on user's interactions.

4. The method as claimed in claim 1, wherein the handling step comprises the steps of:
   grouping one or more strokes into one or more groups of strokes; and
   segmenting one or more strokes into multiple segments.

5. The method as claimed in claim 4, wherein the segmenting step comprises the steps of:
   determining any high-curvature point on a stroke; and
   segmenting the stroke at the high-curvature point.

6. The method as claimed in claim 4, wherein the grouping step comprises the step of grouping multiple strokes based on a time period elapsed between strokes.

7. The method as claimed in claim 1, wherein the handling and analysing steps are applied in an iterative manner until known shapes are identified.

8. The method as recited in claim 1, wherein the identifying step comprising the steps of:
   determining if a stroke or group of strokes matches a shape family; and
   determining which shape type any matched stroke or group of strokes is.

9. The method as recited in claim 1, wherein
   the step of analysing unknown strokes comprises the step of analysing if there is any symmetry in a stroke or group of strokes; and
   the step of enhancing comprises the step of adjusting the stroke or group of strokes for improved symmetry.

10. The method as recited in claim 1, wherein
    the step of analysing unknown strokes comprises the step of determining if a stroke should be connected to another stroke or shape; and
    the step of enhancing comprises the step of connecting the stroke to another stroke or shape if it is determined to be connected.

11. The method as recited in claim 1, wherein
    the step of analysing unknown strokes comprises the step of determining if a stroke should be enhanced; and
    the step of enhancing comprises the step of leaving the stroke intact when it is determined not to be enhanced.

12. The method as recited in claim 1, wherein the enhancing step comprises the steps of:
    providing multiple enhancement processes for enhancing strokes; and
    automatically selectively applying the multiple enhancement processes to the strokes of the sketch drawn by the user, based on the stroke data.

13. The method as recited in claim 12, wherein the automatically selectively applying step comprises a step of selecting an enhancement process using recognition confidence.

14. The method as recited in claim 1, wherein the enhancing step comprises the step of replacing the sketch drawn by the user with an enhanced sketch based on the analysis.

15. The method as recited in claim 1, wherein the enhancing step comprises the steps of:
    analysing relation of an enhanced sketch with any existing content of the document;
    adjusting the enhanced sketch based on the relation analysis; and
    replacing the sketch drawn by the user with the enhanced sketch as adjusted.

16. The method as recited in claim 1, further comprising the step of allowing the user to interact with the sketch.

17. The method as claimed in claim 1, wherein the stroke further includes text, and the analysing step comprises the step of recognizing the text out of the strokes prior to the enhancing step so as to avoid applying shape enhancement to the text.

18. A drawing assistance system implemented by hardware for enhancing a sketch drawn by a user in an electrical document on a computer system, the drawing assistance system comprising:
    a sketch recognition module having:
       a timer;
       a data collection handler for collecting stroke data from one or more strokes of a sketch as a user draws the sketch, the data collection handler using the timer to include in the stroke data time-based information and features of each stroke; and
       a stroke analyser for handling the strokes based on the time-based information, and analysing the strokes based on the strokes handled based on the time-based information, wherein the stroke analyser comprises:
          a stroke comparator for comparing the features of one or more strokes with data of known shapes stored in a data store and identifying any known shapes; and
          a stroke interpreter for analysing any unknown strokes that are not identified as a known shape by determining any high-curvature point on each unknown stroke, segmenting the unknown stroke at the high-curvature point; and determining if each segment of the unknown stroke is linear or curved; and
    a sketch enhancement module for enhancing the sketch based on results of the analysis, wherein the sketch enhancing module replaces the identified known shapes in place of relevant strokes, enhances each segment of the unknown stroke that is determined linear as a line, and enhances each segment of the unknown stroke that is determined curved as a curve.

19. The drawing assistance system as claimed in claim 18, wherein the timer is a dynamic timer which is set and reset based on user's interactions.

20. The drawing assistance system as claimed in claim 18, wherein the stroke analyser comprises:
   a segmentation handler for segmenting one or more strokes into multiple segments by determining any high-curvature point on the strokes; and
   a stroke grouping handler for grouping one or more strokes into one or more groups of strokes based on a time period elapsed between strokes.

21. The drawing assistance system as claimed in claim 18, wherein the stroke interpreter analyses symmetry of a stroke or group of strokes.

22. The drawing assistance system as claimed in claim, 18, wherein the stroke interpreter analyses if a stroke should be connected to another stroke or shape.

23. The drawing assistance system as claimed in claim 18, wherein the stroke interpreter analyses if a stroke should be enhanced.

24. The drawing assistance system as claimed in claim 18, wherein the stroke interpreter has multiple enhancement processes and automatically selectively applies the multiple enhancement processes to the strokes of the sketch drawn by the user, based on the stroke data.

25. The drawing assistance system as claimed in claim 18, wherein the stroke enhancement module comprises:
   a content analyser for analysing relation of an enhanced sketch with any existing content of the document; and
   a sketch replacement handler for adjusting the enhanced sketch based on the relation analysis, and replacing the sketch drawn by the user with the enhanced sketch as adjusted.

26. The drawing assistance system as claimed in claim 18, further comprising:
   an assistance manager for allowing the user to interact with the sketch.

27. The drawing assistance system as claimed in claim 18, wherein the stroke further includes text, and the stroke interpreter recognizes the text out of the strokes using a text recognition module so that the sketch enhancement module avoids applying shape enhancement to the text.

28. A computer readable medium having computer readable code embodied therein for execution of a method of enhancing a sketch drawn by a user in an electrical document on a computer system, the method comprising the steps of:
   collecting stroke data from one or more strokes of a sketch as a user draws the sketch, the sketch including one or more non-linguistic-character shapes, the stroke data including time-based information and features of each stroke;
   handling the strokes based on the time-based information;
   analysing the strokes based on the strokes handled based on the time-based information, wherein the analysing step comprises the steps of:
      comparing the features of one or more strokes with data of known shapes stored in a data store and identifying any known shapes; and
      analysing any unknown strokes that are not identified as a known shape by determining any high-curvature point on each unknown stroke, segmenting the unknown stroke at the high-curvature point; and determining if each segment of the unknown stroke is linear or curved; and
   enhancing the sketch based on results of the analysis, wherein the enhancing step comprising the steps of:
   replacing the identified known shapes in place of relevant strokes;
   enhancing each segment of the unknown stroke as a line when it is determined linear; and
   enhancing each segment of the unknown stroke as a curve when it is determined curved.

* * * * *